(12) United States Patent
Gorza

(10) Patent No.: US 8,128,306 B2
(45) Date of Patent: Mar. 6, 2012

(54) REGULATING DEVICE

(75) Inventor: Roberto Gorza, Feltre (IT)

(73) Assignee: Technogym S.p.A., Gambettola (FC) (IT)

( * ) Notice: Subject to any disclaimer, the term of this patent is extended or adjusted under 35 U.S.C. 154(b) by 184 days.

(21) Appl. No.: 12/586,791

(22) Filed: Sep. 28, 2009

(65) Prior Publication Data

US 2010/0080650 A1   Apr. 1, 2010

(30) Foreign Application Priority Data

Sep. 29, 2008 (IT) ............................. RA2008A0040

(51) Int. Cl.
*F16B 7/16* (2006.01)
(52) U.S. Cl. .................. 403/109.3; 403/105; 403/109.5; 403/322.4; 403/374.5; 248/354.7; 248/409
(58) Field of Classification Search ............... 403/109.2, 403/109.3, 109.5, 109.8, 105, 107, 315, 316, 403/322.4, 374.2, 3, 74.5, 377; 248/354.6, 248/354.7, 407–409, 423; 182/205
See application file for complete search history.

(56) References Cited

U.S. PATENT DOCUMENTS

| 594,084 | A | * | 11/1897 | Hood | 248/407 |
| 644,567 | A | * | 3/1900 | Baetz | 182/205 |
| 722,498 | A | * | 3/1903 | Donecker et al. | 182/149 |
| 971,997 | A | * | 10/1910 | Henning | 182/205 |
| 1,041,701 | A | * | 10/1912 | Thornley | 482/25 |
| 1,329,740 | A | * | 2/1920 | Barron | 182/205 |
| 1,831,613 | A | * | 11/1931 | Symons | 248/354.6 |
| 3,598,431 | A | * | 8/1971 | Giambalvo | 403/107 |
| 3,854,428 | A | * | 12/1974 | Fullenkamp | 108/146 |
| 3,882,966 | A | * | 5/1975 | Fasano | 182/205 |
| 4,087,013 | A | * | 5/1978 | Wiley, Jr. | 414/459 |
| 4,772,069 | A | | 9/1988 | Szymski | |
| 4,807,856 | A | | 2/1989 | Teckenbrock | |
| 5,813,647 | A | * | 9/1998 | Chen | 248/354.7 |
| 6,401,866 | B1 | * | 6/2002 | Roy | 182/204 |
| 2003/0060336 | A1 | | 3/2003 | Ryan et al. | |

OTHER PUBLICATIONS

Italian Search Report dated Jun. 17, 2009.

* cited by examiner

*Primary Examiner* — Joshua Kennedy
(74) *Attorney, Agent, or Firm* — Abelman, Frayne & Schwab

(57) ABSTRACT

A regulating device for gymnastic machines and the like, includes at least a lever (2) for manual selective lock and release, associated with a first member (3), at least a toothed rod (4), associated with a second member (5) slidable relative to said first member (3), and a pawl (6) mechanically interlocked with the lever (2) and selectively engageable in one of the teeth (7) of the toothed rod (4) to block rigidly the second member (5) with respect to the first member (3) in any position by a user the lever (2) being selectively movable from at least a first position of sliding of the second member (5) relative to the first member (3), wherein said pawl (6) can be released from said toothed rod (4), to at least a second position of blocking said second member (5) relative to said first member (3), wherein the pawl (6) is rigidly engaged in one of the teeth (7) of the toothed rod (4), to at least a third position of substantial clearing of the mechanical backlashes between the second member (5) and the first member (3).

18 Claims, 5 Drawing Sheets

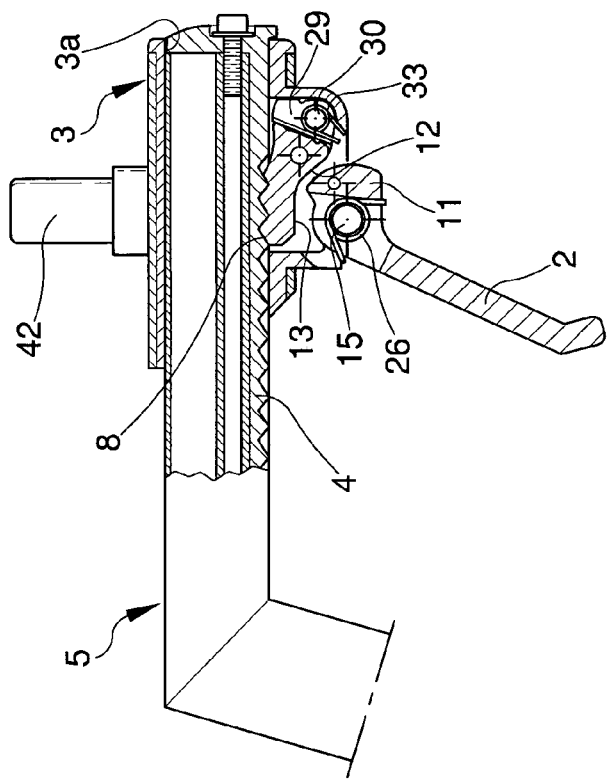

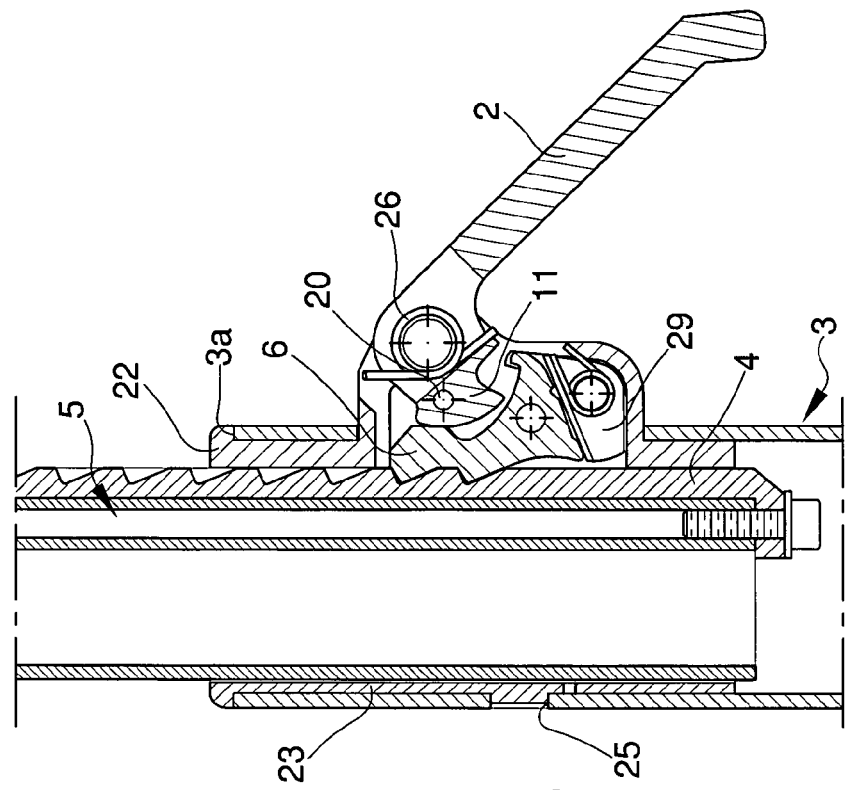
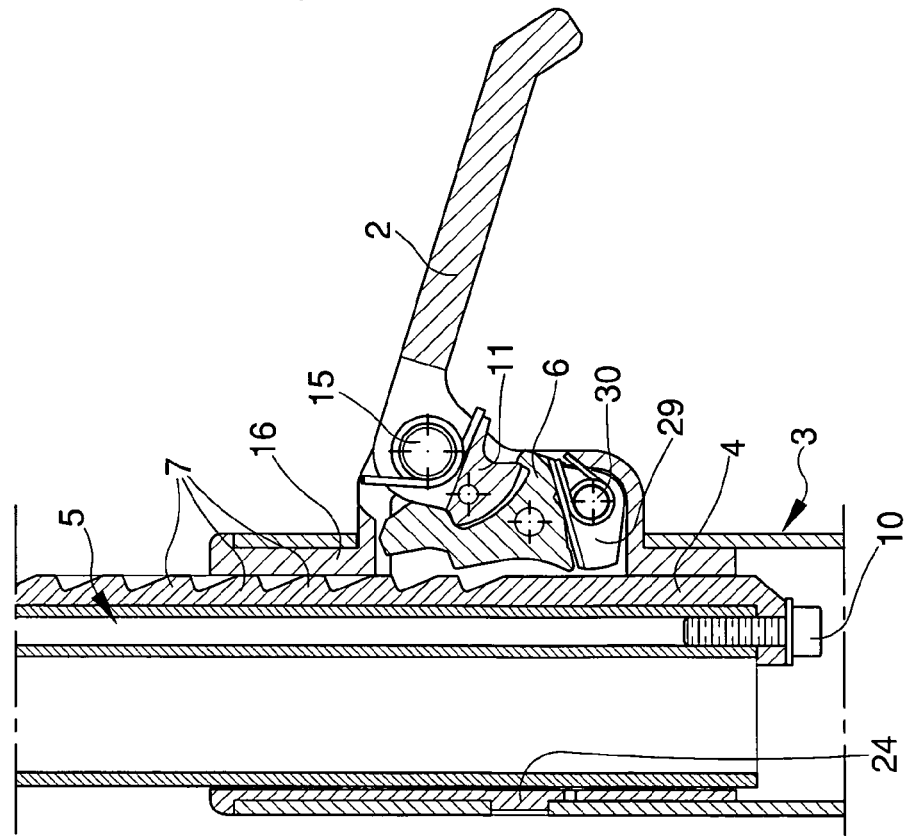

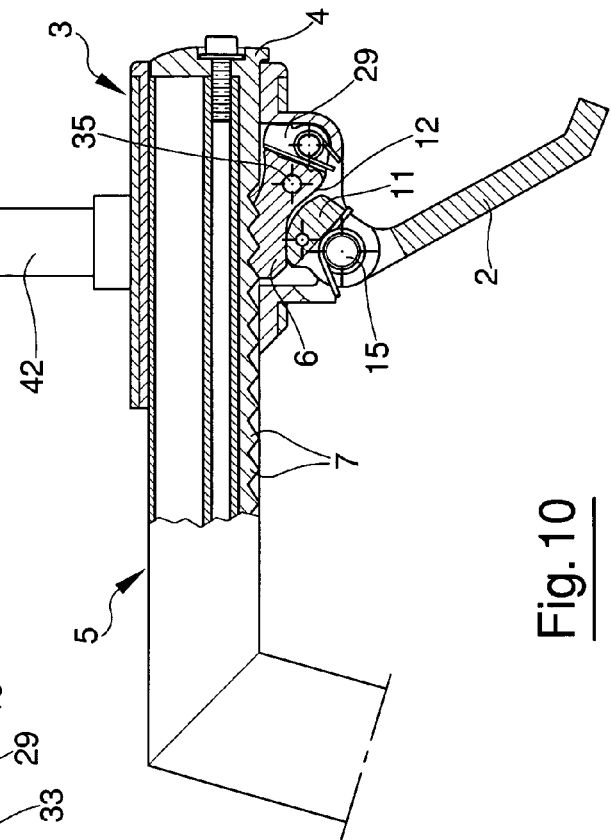
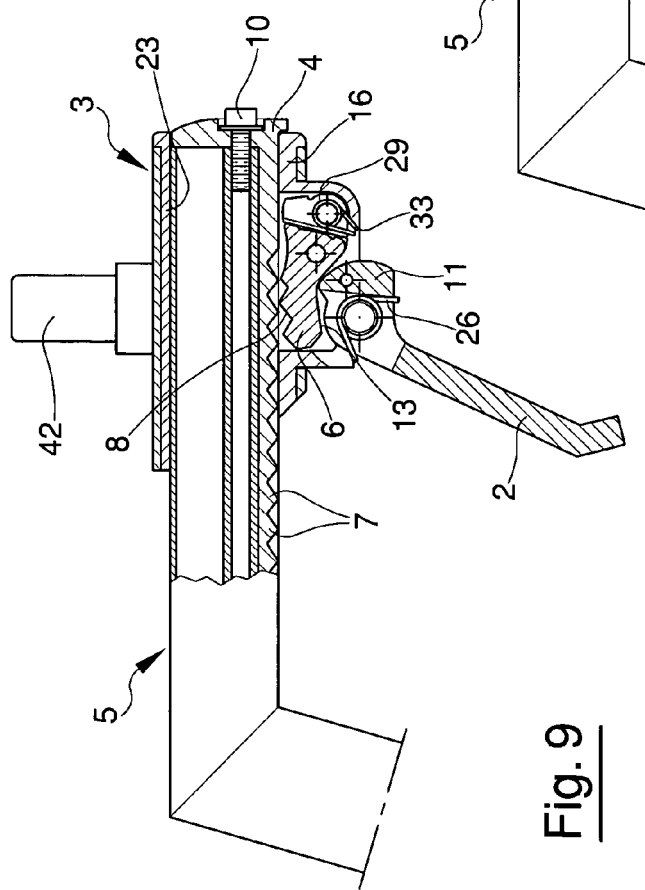

REGULATING DEVICE

BACKGROUND OF THE INVENTION

1. Field of the Invention

The present invention relates to a regulating device for gymnastic machines and the like.

2. Description of the Prior Art

The known gymnastic machines currently on the market, such as for example the stationary bikes or the machines for muscular development, are generally provided with a saddle, seat, support or the like, on which the user of the gymnastic machine sits to perform the gymnastic exercise, or on which he/she rests other parts of the body (the bust, the legs, the feet, or also other parts of the body).

Clearly, these saddles, seats or supports must be adjustable in vertical or horizontal position, or in both the directions, so as to allow the user to perform the gymnastic exercise in conditions of maximum comfort and safety relative to his/her size, furthermore adopting a biomechanically correct position on the machine.

In the sector of the gymnastic machines and the like, numerous mechanical solutions are known, suitable to allow the regulation, at the user's will, of the position of these saddles, seats or supports: some of these allow to obtain a continuous regulation of the position, whilst others allow to obtain a discrete regulation. A typical example of this latter type of regulation, which is of course the most widely used as it is faster, more economic and reliable, comprises a knob for manual activation, associated in a slidable manner with the frame of the gymnastic machine, to which a pin is connected, which is inserted selectively, at the user's will, in a distribution of holes provided in the sleeve of the saddle, seat or support, thus avoiding the lowering thereof due to the weight of the user.

Other known mechanical solutions similar to this latter are the solutions wherein a sort of tooth, interlocked to a lever for manual activation associated to the frame of the gymnastic machine, selectively engages, at the user's will, in a rack provided along the outer surface of the sleeve of the saddle, seat or support.

The mechanical solutions described above, as well as numerous other solutions present from a long time in this sector, are deemed no more qualitatively satisfying, as they are characterised by excessive backlashes between the frame and the sleeve of the saddle, seat or support. These backlashes are particularly annoying for the user while performing the exercise: actually, they cause oscillations of the sleeve in its seat, with consequent impacts, noises and vibrations. These oscillations furthermore generate a sense of instability and insecurity to the user performing the exercise.

The above mentioned backlashes, which characterise the known regulations, cannot be currently eliminated in a substantial manner but with production costs for the mechanical components absolutely too high for the sector of the gymnastic machines.

The technical object of the present invention is therefore to overcome the drawbacks described above, by providing a regulating device for gymnastic machines and the like, which allows to regulate the position of saddles, seats, supports in a fast, intuitive, accurate and reliable manner, allowing at the same time the user to perform the gymnastic exercises in a condition devoid of mechanical backlashes between the support sleeve and the frame of the gymnastic machine.

Within this technical scope, an object of the present invention is to provide a regulating device for gymnastic machines and the like, which is extremely versatile to be applied and used, i.e. which can be adapted to all the types of gymnastic machines currently on the market.

A further object of the present invention is to provide a regulating device for gymnastic machines and the like, which has a simple structure, can be easily implemented, and operates safely at relatively limited costs.

SUMMARY OF THE INVENTION

This scope and objects are achieved through a regulating device for gymnastic machines and the like, comprising at least a lever for manual selective lock and release, associated with a first member, at least a toothed rod, associated to a second member slidable relative to this first member, and a pawl mechanically interlocked to this lever and selectively engageable in one of the teeth of this toothed rod to block rigidly this second member with respect to this first member in any position desired by the user of the gymnastic machine, characterised in that the lever is selectively movable from at least a first position of sliding of the second member relative to the first member, wherein said pawl can be released from said toothed rod, to at least a second position of blocking this second member relative to this first member, wherein this pawl is rigidly engaged in one of the teeth of this toothed rod, to at least a third position of substantial clearing of the mechanical backlashes between the second member and the first member.

The technical features of the invention, according to the above mentioned scopes, are clearly apparent from the attached claims, and the advantage of the invention will be more apparent in the following detailed description of a regulating device for gymnastic machines and the like, with reference to the attached drawings, which represent non limiting examples of embodiment thereof.

BRIEF DESCRIPTION OF THE DRAWINGS

FIG. 1 shows a cross-sectional side elevational view of a regulating device according to first embodiment of the present invention, with the lever in a first angular position;

FIG. 2 shows a cross-sectional side elevational view of the regulating device shown in FIG. 1, with the lever in the second angular position;

FIG. 4 shows a cross-sectional side elevational view of the regulating device shown in FIG. 1, with the lever in the fourth angular position.

FIG. 8 shows a cross-sectional side elevational view of the regulating device according to a second embodiment, with the lever in the first angular position;

FIG. 9 shows a cross-sectional side elevational view of the regulating device of FIG. 8, in a phase of use;

FIG. 10 shows a cross-sectional side elevational view of the device of FIG. 8, with the lever in its second angular position.

DETAILED DESCRIPTION OF THE PREFERRED EMBODIMENT

Figure 5:
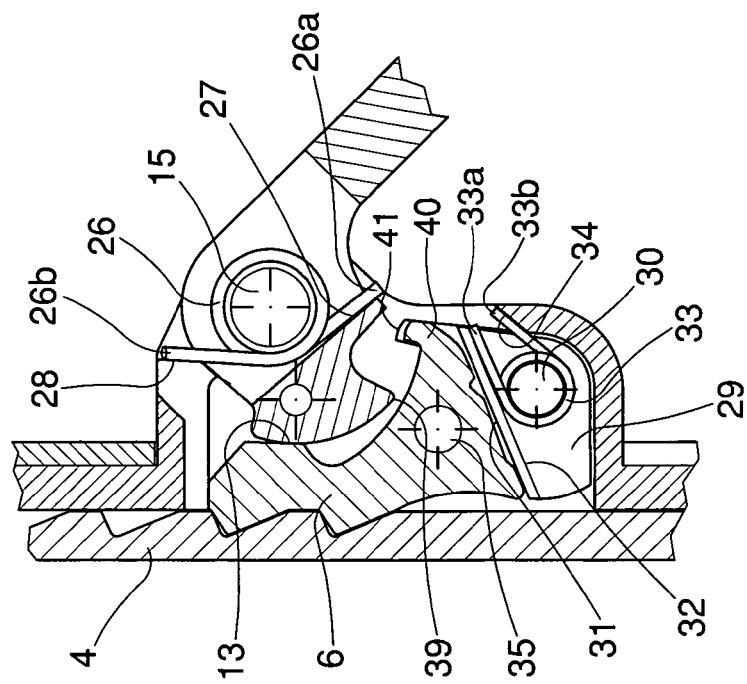
FIG. 5 shows a detail of FIG. 2.

By way of non limiting example, the regulating device according to the present invention can be advantageously used to adjust the vertical or horizontal position of the saddle of a stationary bike, or in the same manner to adjust the position of the seat, of the support, or of other functional components, of a machine for developing muscular force, or to make adjustments of the position of components of other similar machines, without limiting the scope of the present invention.

The detailed description below refers therefore to a device for vertically regulating the position of a saddle of a stationary bike, i.e. the height above the floor, to allow users of different sizes to perform the gymnastic exercises in a correct and comfortable manner.

The regulating device 1 comprises a lever 2 for manual selective lock and release, associated with a first member 3 integral to a frame of the gymnastic machine, not shown for the sake of practicality in the attached figures, as it can be assimilated into a traditional frame of a stationary bike. The regulating device furthermore comprising at least a toothed rod 4, associated to a second member 5 slidable relative to the first member 3; in the embodiment described herein, one should imagine a traditional saddle, not shown in the figures for the sake of clarity, for stationary bikes, rigidly fixed to the second member 5. The device furthermore comprises a pawl 6 mechanically interlocked to the lever 2 and selectively engageable in one of the teeth 7 of the toothed rod 4 to block rigidly the second member 5 relative to the first member 3 in any position desired by the user of the stationary bike, i.e. in such a manner that the saddle is positioned at the desired height above the floor. At this end, the pawl defines a blocking surface 8 of a geometry substantially conjugated with that of the teeth 7 of the toothed rod 4. In this particular embodiment, this blocking surface 8 has such a shape to allow the engagement of the pawl 6 with two teeth 7 of the toothed rod 4.

The first member 3 is formed by a tubular section of substantially square or rectangular shape, which is provided, at the free end 3a, with a substantially rectangular window 9. The second member 5 is formed by a tubular section, with a substantially D-shaped section, onto which the toothed rod 4 is fixed, at one of the side surfaces, through at least a screw 10.

Figure 3:
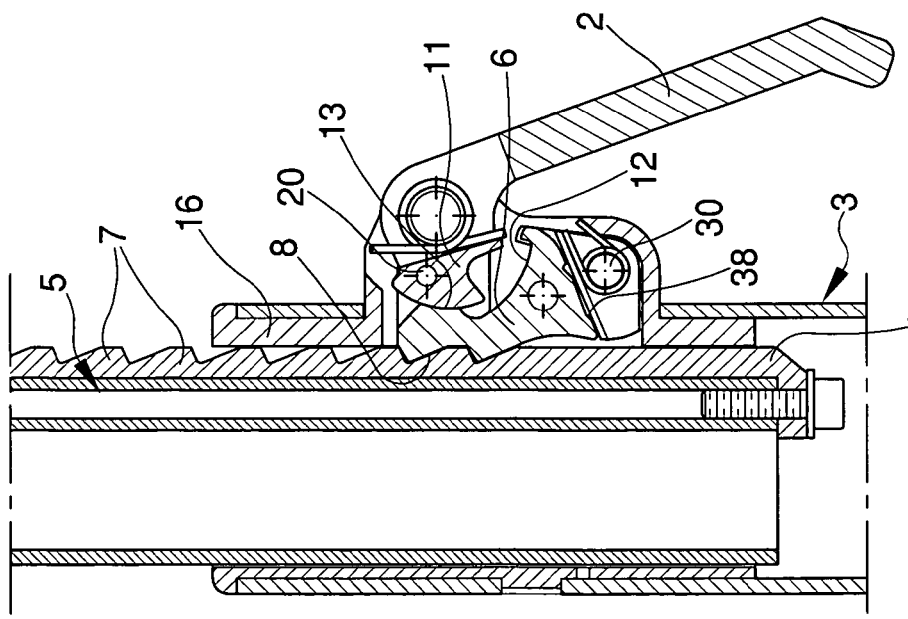
FIG. 3 shows a cross-sectional side elevational view of the regulating device shown in FIG. 1, with the lever in the third angular position.

According to the present invention, the lever 2 is selectively movable by the user from at least a first angular position of sliding of the second member 5 relative to the first member 3, wherein the pawl 6 can be released from the toothed rod 4, to a second angular position of blocking the second member 5 relative to the first member 3, wherein the pawl 6 is rigidly engaged in one of the teeth 7 of the toothed rod 4 (FIG. 2), to a third angular position of substantial clearing of the mechanical backlashes between the second member 5 and the first member 3 (FIG. 3), as it will be more apparent hereunder.

In more detail, the lever 2 adequately defines a cam projection 11 which, together with the lever 2 in the above mentioned first angular position of sliding of the second member 5 relative to the first member 3, engages in correspondence of an adequate recess 12, obtained in the pawl 6, causing the snap release thereof from the toothed rod 4 when a traction is exerted on the second member 5, i.e., in the particular embodiment described herein, when the user wants to lift the saddle; in the second angular position of blocking the second member 5 relative to the first member 3, the cam projection 11 abuts a corresponding contact surface 13 provided in the pawl 6, blocking this latter rigidly engaged in one of the teeth 7 of the toothed rod 4; lastly, in the third angular position of substantial clearing of the mechanical backlashes between the second member 5 and the first member 3, the cam projection 11, due to its particular profile, exerts a pressure of geometrical interference on the same contact surface 13 of the pawl 6 so as to maintain the second member 5 stably and rigidly into contact with the inner surface 14 of the first member 3, without relative displacements, vibrations, impacts, noises or the like.

The particular geometry of the cam projection 11 and of the corresponding recess 12 of the pawl 6 advantageously allow the lever 2 to be selectively movable also in a further fourth position of free sliding of the second member 3 relative to the first member 5, i.e. in a position wherein the pawl 6 is completely released from the toothed rod 4, as it will be explained hereunder. This fourth angular position of the lever 2 allows the second member 5 to be freely lifted, and, most of all, lowered relative to the first member 3: the lowering action cannot be actually performed in the first angular position of the lever 2, as the geometry of the teeth 7 and of the blocking surface 8 of the pawl 6, which is asymmetric relative to the vertical direction of sliding of the second member 5 relative to the first member 3, does not allow a relative displacement if the pawl 6 is not completely released from the toothed rod 4.

The lever 2 is carried rotatable, in correspondence of a first hinge pin 15 inserted in a through channel 15a, in a plate 16 integral with the first member 3 substantially in correspondence of the window 9.

The plate 16 forms a pair of mutually opposite ears 17, defining between them an aperture 17a, through which the action of the pawl 6 is exerted, provided with first through holes 18a, in which the first hinge pin 15 is engaged, and with second through holes 18b, and it is furthermore provided, in correspondence of the inner face of one of these ears 17, with a sliding groove 19 for a stop pin 20 for stopping the rotation of the lever 2 obtained in one of its lateral surfaces 21. The plate 16 furthermore presents an abutment edge 22 on the open free end 3a of the first member 3; in order to assure a correct shape coupling between the first member 3 and the second member 5, it is positively provided that at the above mentioned open free end 3a of the first member 3 a sort of inner sheath 23 is inserted, with cross section which is externally conjugated to that of the first member 3 and internally to that of the second member 5, with lateral edges that, once the assembling has been performed, match that of the plate 16.

Figure 7:
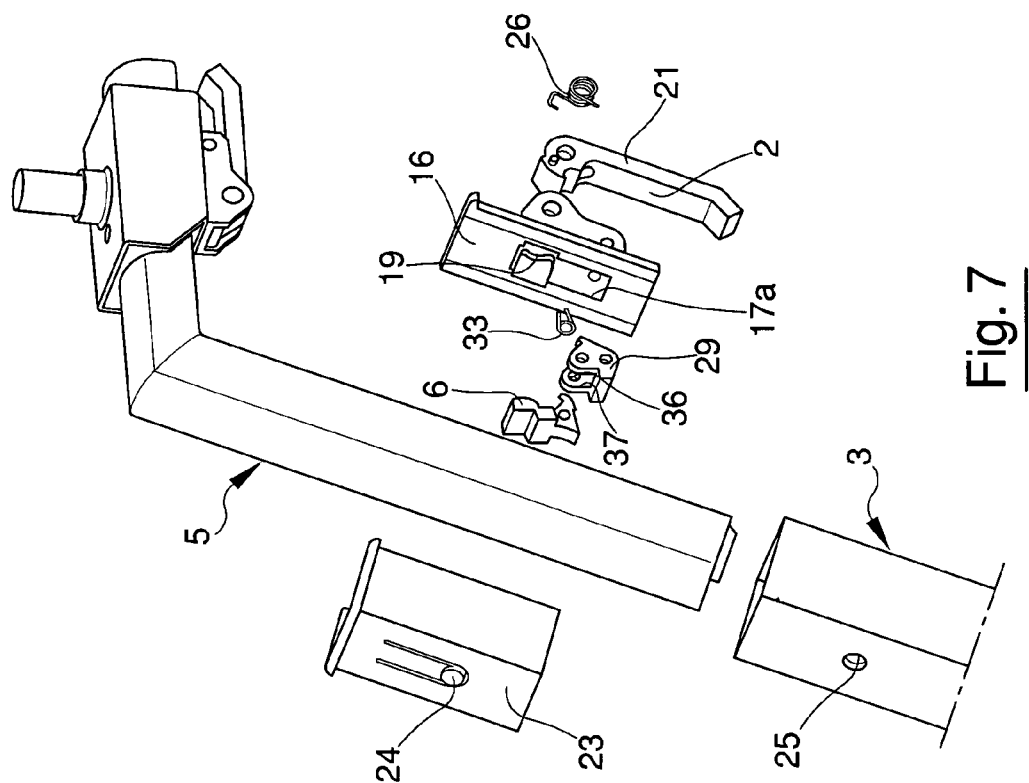
FIG. 7 shows a front perspective and exploded view of the regulating device shown in FIG. 6.
Figure 6:
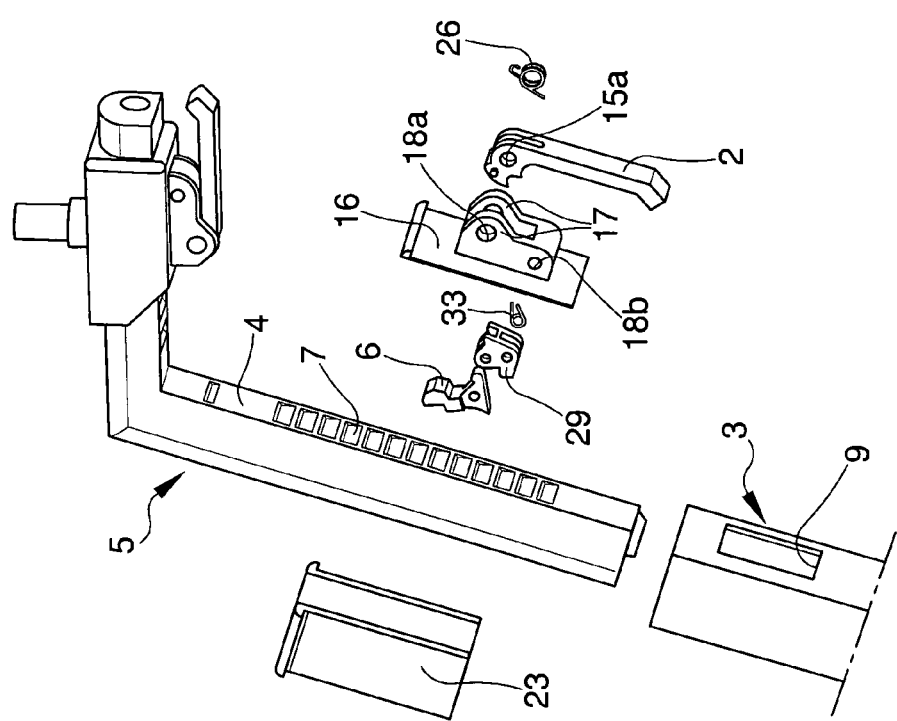
FIG. 6 shows a rear perspective and exploded view of the regulating device according to the present invention.

The inner sheath 23 is provided, at one of its lateral surfaces, with a substantially U-shaped notch, which defines an elastically flexible tab having a disk-shaped end projection 24 (FIG. 7), suitable to engage at a corresponding hole 25 obtained in the first member 3, so as to fix the inner sheath 23 to the first member 3 in an immovable manner. In more detail, for assembling the inner sheath 23 in the first member 3 it is necessary to insert the sheath 23 in the open free end 3a, so that the projections 24 snap engages the hole 25; on the contrary, for removing the inner sheath 23 it is necessary to exert a pressure on the projection 24 so as to remove it from the hole 25, and allow the inner sheath 23 to slip out of the first member 3.

The lever 2 is associated to a first return spring 26 which maintains it, in an elastically stable manner, in the second angular position of blocking the second member 5 relative to the first member 3. This first return spring 26 is of the cylindrical torsion type, is engaged along the first hinge pin 15 and comprises a first end 26a arranged in abutment on a housing 27 provided in the lever 2, and a second end 26b abutting on a stop 28 provided in the plate 16.

The regulating device according to the present invention adequately comprises an elastic return member 29, associated in a rotatable manner with the plate 16 and suitable to maintain the pawl 6 engaged in one of the teeth 7 of the toothed rod 4, in an elastically stable arrangement of blocking the second member 5 relative to the first member 3 in the desired position, corresponding to the first angular position of the lever 2.

In this way, the pawl 6 is therefore maintained engaged in the toothed rod 4 due to the action of the elastic return member 29, but the geometry of the teeth 7 of the toothed rod 4 and of the blocking surface 8 of the pawl 6, which is substantially asymmetrical relative to the direction of sliding of the second member 5 relative to the first member 3, allows manually to drag the second member 5 relative to the first member 3 in such a manner that sliding of the pawl 6 on the surface of the teeth 7 of the toothed rod 4 causes a "jumping" of the pawl 7 from a tooth 7 to the other.

The elastic return member 29 is carried rotatable in the plate 16 in correspondence of a second hinge pin 30, engaged in the second through holes 18b: the elastic return member 29 defines a first coupling surface 31 for coupling with the pawl 6 and a second coupling surface 32 for coupling with a second return spring 33. The second return spring 33 is of the cylindrical torsion type, is engaged along the second hinge pin 30 and comprises a first end 33a abutting on the second coupling surface 32 of the elastic return element 29, and a second end 33b abutting on an adequate abutment surface 34 provided in the plate 16.

Advantageously, the pawl 6 is articulated to the elastic return member 29 in correspondence of a third hinge pin 35; the elastic return member 29 is provided with a third through hole 36 for the third hinge pin 35 and with a centreline notch 37, which intercepts the third through hole 36, defining the first coupling surface 31 for coupling with the pawl 6. This first coupling surface 31 of the elastic return member 29 is preferably constituted by an inclined plane, to which a corresponding flattened face 38 of the pawl 6 can be coupled.

The cam projection 11 presents a profile substantially shaped as an arc of a circle, with radius increasingly higher from an end to the other (see in particular FIG. 5). Advantageously the cam projection 11 forms an end corner 39 (corresponding to the end with greater radius of the cam projection 11), whilst the pawl 6 forms a first coupling edge 40 with this corner 39; analogously, the elastic return member 29 forms a second coupling edge 41 with the same end corner 39, with a geometry reproducing that of the first coupling edge 40. The selective manual rotation of the lever 2 from the first angular position of snap sliding to the fourth angular position of free sliding is therefore suitable to put the elastic return member 29 into rotation around the second hinge pin 30, and consequently the pawl 6 around the third hinge pin 35, so as to release the pawl 6 from the toothed rod 4 and to allow the manual free displacement of the second member 5 relative to the first member 3.

The way of use of the regulating device according to the present invention is as follows.

Assuming that at the beginning the regulating device is in an arrangement, wherein the lever 2 is in the third angular position of substantial clearing of the mechanical backlashes, a position in which the gymnastic exercises can be performed in a reliable manner, it is necessary, in order to lift the saddle, that the user manually acts on the lever 2 by rotating it (in anticlockwise direction in the figures) and bringing it firstly, temporarily, in the second angular position of blocking, and then in the first angular position of sliding, by supporting it with the hand to win the action of the first return spring 26: as mentioned, in this position the cam projection 11 engages in the recess 12 of the pawl 6, and this latter is therefore snap elastically yielding along the toothed rod 4. The user can therefore exert traction upwards on the second member 5 relative to the first member 3, and he/she can lift the saddle by a tooth 7 at a time, thus obtaining a discrete and fine regulation. On the contrary, if the user wants to lift the saddle in a quickly manner and without particular accurateness, or if he/she wants to lower it by a single tooth 7, he/she must further rotate the lever 2 in anticlockwise direction, until it is in the fourth angular position (FIG. 4), always supporting it with the hand. In this way, the end corner 39 of the cam projection 11 of the lever 2 pushes on the first and on the second coupling edge 40, 41, thus causing the anticlockwise rotation of the pawl 6 and therefore its complete release from the toothed rod 4. Once the optimum height has been set manually with the pawl 6 released from the toothed rod 4, the user releases the lever 2: thanks to the action of the elastic return member 29, the pawl 6 engages again in the toothed rod 4, thus avoiding further lowering of the second member 5, whilst the lever 2, under the action of the first return spring 26, spontaneously returns in the second angular position of blocking, so that the cam projection 11 matches the contact surface 13 of the pawl 6, which is thus rigidly fixed. Already in this arrangement the user could perform the gymnastic exercises in a safe manner, thanks to the fact that, as mentioned above, the lowering of the second member 5 is prevented. Lastly, to block the saddle at the desired height without backlashes, and to perform the gymnastic exercises in maximum comfort, the user further rotates the lever 2 in the third angular position of substantial clearing of the mechanical backlashes, a position in which the cam projection 11, thanks to the geometrical interference due to its particular profile, exerts a pressure of preset entity onto the contact surface of the pawl 6, and this pressure is then transmitted to the second member 5, which is maintained rigidly into contact with the inner surface 14 of the first member 3.

It has been described how the present invention achieves the provided objects and scopes.

The regulating device according to the present invention allows to perform the accurate, fast, safe and reliable registration of the saddle, seat or support of any type of gymnastic machine, in a plurality of horizontal or vertical positions, in which there is a substantial clearing of the mechanical backlashes between the sleeve of the saddle, seat or support and the frame; this allows the user to perform the physical exercises in conditions of maximum comfort, without feeling the undesired sense of instability and oscillation of the saddles, seats or supports of the traditional regulating devices. These clear advantages are furthermore obtained with a device of extremely limited cost, as well as easy to be produced and assembled.

Modifications and variants can be applied to the present invention, without however departing from the protective scope of the present invention.

FIGS. 8, 9, and 10 illustrate a second embodiment of the regulating device for gymnastic machines and the like according to the present invention, wherein the same reference number are used, for the sake of convenience and simplicity, as that used for the first embodiment above. In particular, FIG. 8 shows the device with the lever 2 in the first angular position, FIG. 9 shows the device in a phase of use, wherein the first member 3 is translated relative to the second member 5, in this case integral to the frame of the gymnastic machine, whilst FIG. 10 shows the device according to the present invention with the lever 2 in the second angular position.

The second embodiment of the present invention is constituted by a regulating device for horizontally regulating the position of a saddle of a stationary bike (known and therefore not shown in the attached figures), i.e. the distance thereof from the handlebar, to allow users of different sizes to perform the gymnastic exercises in a correct and comfortable manner. The second member 5 is formed by a tubular metal section with a substantially D-shaped cross section (preferably a horizontal elongation of the sleeve of the saddle of the stationary bike), whilst the first member 3 is formed by a segment of tubular metal section with substantially rectangular cross section, inside which an inner sheath 23 is inserted with section complementary to that of the second member 5. A support 42 is integral with the first member 3, to which the saddle, not shown in the figures, can be connected. The toothed rod 4, fixed to the second member 5 through a screw 10, presents teeth 7 with substantially symmetrical geometry relative to the direction of displacement of the first member 3 relative to the second member 5, as well as the blocking surface 8 of the pawl 6.

In this second embodiment, the lever 2 is selectively movable in the first three angular positions described with reference to the first embodiment. The particular design of the components of this second embodiment, destined to satisfy implementation requirements different from that of the first embodiment, does not provide for the lever 2 to be positioned in the fourth angular position described above, that is not necessary in this case. In more detail, by comparing the first embodiment, the pawl 6 is devoid here of the first coupling edge 40, whilst the elastic return member 29 is devoid of the second coupling edge 41. The previously described action is therefore not provided of dragging the cam projections 11, causing the rotation of the pawl 6 with consequent release thereof from the toothed rod 4. The horizontal displacement of the first member 3 relative to the second member 5, with the lever in the first angular position of sliding, can therefore occurs by a tooth 7 at a time, and, indifferently, towards or backwards, as the horizontal regulation of the saddle of a stationary bike must preferably occur within a more limited path and in a more accurate manner relative to the vertical regulation thereof.

The invention is therefore provided with industrial applicability; modifications and variants can be however applied to it, without departing from the protective scope of the invention; furthermore, all the details can be replaced with technically equivalent elements, without however departing from the protective scope of the following claims.

The present invention relates to a regulating device for gymnastic machines and the like.

The known gymnastic machines currently on the market, such as for example the stationary bikes or the machines for muscular development, are generally provided with a saddle, seat, support or the like, on which the user of the gymnastic machine sits to perform the gymnastic exercise, or on which he/she rests other parts of the body (the bust, the legs, the feet, or also other parts of the body).

Clearly, these saddles, seats or supports must be adjustable in vertical or horizontal position, or in both the directions, so as to allow the user to perform the gymnastic exercise in conditions of maximum comfort and safety relative to his/her size, furthermore adopting a biomechanically correct position on the machine.

In the sector of the gymnastic machines and the like, numerous mechanical solutions are known, suitable to allow the regulation, at the user's will, of the position of these saddles, seats or supports: some of these allow to obtain a continuous regulation of the position, whilst others allow to obtain a discrete regulation. A typical example of this latter type of regulation, which is of course the most widely used as it is faster, more economic and reliable, comprises a knob for manual activation, associated in a slidable manner with the frame of the gymnastic machine, to which a pin is connected, which is inserted selectively, at the user's will, in a distribution of holes provided in the sleeve of the saddle, seat or support, thus avoiding the lowering thereof due to the weight of the user.

Other known mechanical solutions similar to this latter are the solutions wherein a sort of tooth, interlocked to a lever for manual activation associated to the frame of the gymnastic machine, selectively engages, at the user's will, in a rack provided along the outer surface of the sleeve of the saddle, seat or support.

The mechanical solutions described above, as well as numerous other solutions present from a long time in this sector, are deemed no more qualitatively satisfying, as they are characterised by excessive backlashes between the frame and the sleeve of the saddle, seat or support. These backlashes are particularly annoying for the user while performing the exercise: actually, they cause oscillations of the sleeve in its seat, with consequent impacts, noises and vibrations. These oscillations furthermore generate a sense of instability and insecurity to the user performing the exercise.

The above mentioned backlashes, which characterise the known regulations, cannot be currently eliminated in a substantial manner but with production costs for the mechanical components absolutely too high for the sector of the gymnastic machines.

The technical object of the present invention is therefore to overcome the drawbacks described above, by providing a regulating device for gymnastic machines and the like, which allows to regulate the position of saddles, seats, supports in a fast, intuitive, accurate and reliable manner, allowing at the same time the user to perform the gymnastic exercises in a condition devoid of mechanical backlashes between the support sleeve and the frame of the gymnastic machine.

Within this technical scope, an object of the present invention is to provide a regulating device for gymnastic machines and the like, which is extremely versatile to be applied and used, i.e. which can be adapted to all the types of gymnastic machines currently on the market.

A further object of the present invention is to provide a regulating device for gymnastic machines and the like, which has a simple structure, can be easily implemented, and operates safely at relatively limited costs.

What is claimed is:

1. A regulating device for adjusting gymnastic machines having a first member and a second member slidable relative to the first member, the device comprising:
   a lever for manual selection of lock and release, associated with said first member;
   a toothed rod having teeth, associated with said second member;
   a pawl mechanically interlocked to said lever and selectively engageable in one of the teeth of said toothed rod to block said second member with respect to said first member in any position desired by the user of the gymnastic machine;
   said lever being rotatably carried with respect to said first member and being, in use, selectively movable from at least a first position of free sliding of said second member relative to said first member, wherein said pawl is completely released from said toothed rod, to at least a second position of snap sliding of said second member relative to said first member only in a given direction, wherein said pawl can be snap released from said toothed rod when a traction is exerted on the second member in said given direction, to at least a third position of blocking said second member relative to said first member, wherein said pawl is rigidly engaged in one of said teeth of said toothed rod;

a first return means for mechanically coupling said first member to said lever to maintain, in use, in an elastically stable manner said lever in said third position of blocking said second member relative to said first member; and a second return means for coupling said first member to said pawl to maintain, in use, said pawl in an elastically stable and snap releasable engagement in one of said teeth of said toothed rod.

2. A device according to claim 1, wherein said lever defines at least a cam projection which, together with said lever in said second position of snap sliding of said second member relative to said first member, engages in a corresponding recess of said pawl causing the snap release thereof from said toothed rod, in said third position of blocking said second member relative to said first member, abuts on a corresponding contact surface of said pawl.

3. A device according to claim 2, wherein when said lever is in the first position of free sliding of said second member relative to said first member, said cam projection acts in correspondence of said recess of said pawl in such a way so as to cause the rotation of said pawl around a third hinge pin releasing it from said toothed rod.

4. A device according to claim 2, wherein said lever is selectively movable in a fourth position of clearing of the mechanical clearance between said second member and said first member; in said fourth position said cam projection exerting a pressure of geometrical interference on said contact surface of said pawl so as to maintain said second member stably and rigidly into contact with the inner surface of said first member.

5. A device according to claim 1, wherein said lever is carried rotatable, in correspondence of a first hinge pin engaged in a first through hole, in a plate integral with said first member substantially in correspondence of the free end thereof 6. A device according to claim 5, wherein said first return means comprises a first return spring of the cylindrical torsion type engaged along said first hinge pin and comprising a first end arranged in abutment on a housing provided in said lever, and a second end abutting on a stop provided in said plate.

7. A device according to claim 5, wherein said second return means comprises at least an elastic return member, carried rotatable in said plate in correspondence of a second hinge pin engaged in a second through hole.

8. A device according to claim 7, wherein said second return means further comprises a second return spring; said elastic return member defining a first coupling surface for coupling with said pawl and a second coupling surface for coupling with said second return spring.

9. A device according to claim 8, wherein said second return spring is of the cylindrical torsion type, engaged along said second hinge pin and comprising a first end abutting on said second coupling surface of said elastic return element, and a second end abutting on a suitable abutment surface provided in said plate.

10. A device according to claim 8, wherein said first coupling surface of said elastic return member is constituted by at least an inclined plane, to which a corresponding flattened face of said pawl can be coupled.

11. A device according to claim 7, wherein said pawl is articulated to said elastic return member in correspondence of a third hinge pin.

12. A device according to claim 11, wherein said elastic return member is provided with a third through hole for said third hinge pin and with a centreline notch, which intercepts said third through hole, defining said first coupling surface for coupling with said pawl.

13. A device according to claim 11, wherein said cam projection forms at least an end corner, in that said pawl forms a first coupling edge with said end corner and that said elastic return member forms a second coupling edge with said end corner, the selective rotation of said lever from said second position of snap sliding to said first position of free sliding being suitable to put said elastic return member into rotation around said second hinge pin and said pawl around said third hinge pin, so as to release said pawl from said toothed rod and to allow the free sliding of said second member with respect to said first member.

14. A device according to claim 13, wherein said cam projection presents a profile substantially shaped as an arc of a circle, with radius increasingly higher from an end to the other toward said end corner.

15. A device according to claim 7, wherein said plate forms a pair of mutually opposite ears, defining between them an aperture through which the action of said pawl is exerted, provided with said first and second through holes, for supporting said first hinge pin and second hinge pin, said plate being furthermore provided, in correspondence of the inner face of one of said ears, with a sliding groove for a stop pin for stopping the rotation of said lever obtained in one of its lateral surfaces.

16. A device according to claim 1, wherein said pawl defines at least a blocking surface of a geometry substantially conjugated with that of said teeth of said toothed rod.

17. A device according to claim 1, wherein said first member is adapted to be integrally coupled with a frame of a gymnastic machine.

18. A device according to claim 1, wherein said second member is adapted to be integrally coupled with a frame of a gymnastic machine.

* * * * *